United States Patent Office 3,069,369
Patented Dec. 18, 1962

3,069,369
COLOR STABILIZED POLYETHYLENE COMPOUNDS
Albert D. Galbraith, Longmeadow, and Daniel A. Popielski, Springfield, Mass., assignors to Monsanto Chemical Company, St. Louis, Mo., a corporation of Delaware
No Drawing. Filed Nov. 14, 1957, Ser. No. 696,329
6 Claims. (Cl. 260—23)

This invention relates to polyethylene compounds. More particularly, it relates to polyethylene compounds stabilized against the degradational effects of infra-red radiation, i.e., heat and light. As herein applied, the term "polyethylene compound" refers to polyethylene resins containing conventional additives for the modification and control of the physical properties thereof.

The color degradation of commercial polyethylene compounds remains a serious problem and one which severely affects their utility in many important applications. For instance, problems of heat stability require that polyethylene compounds be processed and fabricated at rather low temperatures with only brief exposure permitted to even these low temperatures. This is a severe handicap when attempting to mold complex shapes with tortuous channels, or when dispersing colorants, etc. Far more serious is the problem presented in the reworking of polyethylene scrap material wherein high melt temperatures and prolonged heating are required; a combination which frequently results in yellowed stock of decreased value. Finally, polyethylene compounds yellow noticeably, due to radiated heat, after a few months storage; even though stored under optimum conditions. Heretofore, attempts to stabilize polyethylene compounds against infra-red radiation have met with only a modicum of success.

Now it is an object of this invention to provide polyethylene compounds possessing superior resistance to color degradation due to infra-red radiations.

Another object is to make possible the reworking of polyethylene scrap without undue loss due to color degradation.

Another object is to provide storage stable polyethylene compounds.

A further object is to increase and diversify the utilization of polyethylene compounds.

These and other objects are attained by incorporating into polyethylene compounds a mixture of (A) a sterically hindered phenol, (B) a trialkyl phosphite, (C) a zinc, cadmium or mercury salt of a fatty acid, and (D) a sodium, aluminum, calcium, magnesium or strontium salt of a fatty acid or mixtures thereof. In a secondary embodiment of this invention, component (D) may be omitted.

The following examples are given in illustration of the invention and are not intended as limitations thereon. Where parts are mentioned, they are parts by weight.

EXAMPLE I

One hundred parts of a polyethylene compound comprised essentially of a polyethylene resin having a number-average molecular weight of about 29,000 containing about 0.2 part of nonylamine sulphate and about 0.2 part of oleic acid amide are charged to a Banbury mixer. Substantially simultaneously therewith the following materials are also charged.

| | Parts |
|---|---|
| $A_1$—2,6-ditertiarybutyl-4-methyl-phenol | 5.0 |
| $B_1$—Tri-iso-octyl phosphite | 2.0 |
| $C_1$—Zinc stearate | 0.8 |
| $D_1$—Magnesium stearate | 0.8 |

Cooling water is circulated through the Banbury jacket and the charge is mixed at a peripheral rotor speed of about 220 feet per minute, under a 15 p.s.i.g. ram pressure. After fusion has occurred, the ram pressure is released and mixing is continued until a total mixing time of about 6 minutes has elapsed. The charge is then dropped. Compression molded test slabs are prepared by heating the compound at 160° C. for 5 minutes under contact pressure, then raising the pressure to 5000 p.s.i. and cooling. The test slabs are placed in an air oven heated at 103° C. and are removed at frequent intervals, examined for color and replaced. The test results are summarized in Table I.

EXAMPLE II

Example I is repeated, omitting material $D_1$. The test results appear in Table I.

EXAMPLE III

Example I is repeated several times, using materials $A_1$, $B_1$, and $C_1$ in the following combinations (a) $A_1$ and $B_1$, (b) $A_1$ and $C_1$, (c) $B_1$ and $C_1$, (d) $A_1$, (e) $B_1$, and (f) $C_1$. The test results appear in Table I.

EXAMPLE IV

Compression molded test slabs are prepared as in Example I, using an unstabilized polyethylene compound comprised essentially of a polyethylene resin having a number-average molecular weight of about 29,000 containing about 0.2 part of oleic acid amide. The test slabs are placed in an air oven heated at 103° C. and are evaluated as in Example I. The test results appear in Table I.

For brevity, the several materials are designated in Table I by the letters $A_1$, $B_1$, $C_1$ and $D_1$, as in Example I, and the colors are abbreviated to; cl.—clear, p.y.—pale yellow, y.—yellow, and d.y.—dark yellow.

Table I

| Example | Combination of materials | Color of test samples after heating for— | | | |
|---|---|---|---|---|---|
| | | 5 days | 10 days | 15 days | 20 days |
| I | $A_1B_1C_1D_1$ | cl. | p.y. | p.y. | p.y. |
| II | $A_1B_1C_1$ | cl. | p.y. | p.y. | y. |
| IIIa | $A_1B_1$ | d.y. | | | |
| IIIb | $A_1C_1$ | d.y. | | | |
| IIIc | $B_1C_1$ | y. | d.y. | | |
| IIId | $A_1$ | d.y. | | | |
| IIIe | $B_1$ | y. | d.y. | | |
| IIIf | $C_1$ | d.y. | | | |
| IV | none | cl. | p.y. | y. | d.y. |

Similar results are obtained when cadmium oleate or mercury palmitate are substituted for the zinc stearate ($C_1$) or when sodium stearate, calcium oleate or aluminum laurate are substituted for the magnesium stearate ($D_1$).

The polymeric compounds used in this invention are alkylene resins compounded with conventional ancillary additives. The term "alkylene resin" refers to polymers of ethylene, propylene or isobutylene having a number-average molecular weight, as measured by osmotic pressure, of from 500 to 50,000. It includes both homopolymers and copolymers, e.g., ethylene-vinyl acetate, wherein the alkylene comprises at least 50 mol percent. Also included are paraffin waxes. Typical ancillary additives employed in such polyalkylene compounds include plasticizers, colorants, fillers, lubricants, destaticizers, antislip agents, etc.

In the preferred embodiment of this invention the infra-red stabilizer used is a quaternary combination of materials, as follows.

One material (A) of the stabilizing combination is a sterically hindered phenol, i.e., a phenol, alkylene-bis phenol or a thio-bis phenol containing two or more ring-substituted hydrocarbon radicals. If phenol is used, at least one of the hydrocarbon radicals must be a complex group in the ortho position, and superior results are obtained if both ortho positions contain complex groups. The bis phenols must contain one or more such complex groups in the ortho positions only when the alkylene or thio linkage is not in said ortho position. As herein used, a complex group is at least an isopropyl radical and preferably a terpene or tertiary alkyl radical. Examples of sterically hindered phenols include 2-isopropyl-4-ethyl phenol, 2,6-ditertiarybutyl-4-methyl phenol, 2,4-dimethyl-6-isobornyl phenol, 6,6'-methylenebis (2-methyl-4-ethyl phenol), 4,4'-thio-bis(3-methyl-6-tertiary-butyl phenol), etc. Actually, any such sterically hindered phenol may be used, but their efficacy varies. Therefore, it is preferred to use a 2,6-ditertiary alkyl-4-alkyl phenol such as 2,6-ditertiary-butyl-4-methyl phenol, etc.

A second material (B) is a trialkyl phosphite wherein the alkyl groups are primary, secondary or tertiary alkyl groups containing from 1 to 20 carbon atoms. For example, trimethyl phosphite, tri-isopropyl phosphite, tri-tertiary butyl phosphite, tri-isooctyl phosphite, tri-stearyl phosphite, etc. The relatively high volatility of the lower molecular weight trialkyl phosphites usually results in some evaporation losses during the processing or fabrication of the host compound. To avoid such losses, it is preferred to use the higher boiling trialkyl phosphites such as tri-isooctyl phosphite, tri-stearyl phosphite, etc.

A third material (C) is a zinc, cadmium, or mercury salt of a fatty acid containing from 4 to 18 carbon atoms. These salts may be derived from either saturated or unsaturated fatty acids such as butyric acid, lauric acid, palmitic acid, stearic acid, oleic acid, ricinoleic acid, linoleic acid, etc. If desired, mixtures of these metallic salts may be used.

The fourth and final material (D) is a sodium, aluminum, calcium, magnesium or strontium salt of a fatty acid containing from 4–18 carbon atoms. As with material (C) these metallic salts may be derived from either saturated or unsaturated fatty acids such as butyric acid, lauric acid, palmitic acid, stearic acid, oleic acid, ricinoleic acid, linoleic acid, etc. Again, if desired, mixtures of these metallic salts may be used.

Surprisingly small proportions of the 4 stabilizing materials, added to polyethylene compounds, have been found to produce significant improvements in the heat and light stability thereof. However, it is obvious that their efficacy should be proportional to the concentrations of the several materials. This has been found to be so, up to the concentration level whereat the other desirable physical characteristics, e.g., plasticity, strength, etc. of the polyethylene compounds become seriously impaired. As a practical limit, the total concentration of the 4 materials should not exceed about 10% by weight based upon the weight of the polyethylene compound. Other than this, the several components may be used in any concentrations within those limits shown in Table II below.

*Table II*

| Material | Concentrational range in percent by weight | |
|---|---|---|
| | Maximum | Preferred |
| A | 0.1–5.0 | 3.0–5.0 |
| B | 0.02–5.0 | 1.0–3.0 |
| C | 0.02–5.0 | 1.5–3.0 |
| D | 0.00–5.0 | 0–2.0 |

In a secondary embodiment of this invention, material (D) is omitted from the stabilizing system. In other words, only the sterically hindered phenol, the trialkyl phosphite and the zinc, cadmium or mercury salt of a fatty acid are used to stabilize the polyethylene compound. As can be seen in Table I, this ternary stabilizing system is not quite as effective as the quaternary system, but it still provides resinous compounds possessed of superior stability to heat and light.

The synergistic stabilizing effect of the ternary and quaternary combinations of this invention is apparent from study of Table I. The un-stabilized polyethylene compound used as a control (Example IV) remains a pale yellow after 10 days of heating at 103° C. but becomes a definite yellow by 15 days. Both the ternary and quaternary stabilizing combinations produce considerably improved stability. A polyethylene compound containing the quaternary combination is still a pale yellow after 15 days of heating, and one containing the quaternary combination remains a pale yellow after 20 days of heating. In contrast, polyethylene compounds containing only 1 or 2 of the several components in various combinations exhibit substantial discoloration within 5 days of such heating.

The several stabilizing materials may be incorporated into the resinous compound by any of the conventional methods, i.e., milling, extrusion, Banbury, etc.

Polyethylene compounds prepared according to this invention possess high stability to heat and infra-red light. The compounds may be fabricated by injection, compression, or blow molding or by strand, tube, sheet or blow extrusion according to conventional techniques. The products are suitable for any of the existing applications for polyethylene compounds. However, the special properties of the compounds of this invention make them especially valuable for such applications as window shades, outdoor insulation, storm windows, etc. Furthermore, scrap polyethylene containing the stabilizers of this invention may be reworked without fear of color degradation.

It is obvious that many variations may be made in the products and processes set forth above without departing from the spirit and scope of this invention.

What is claimed is:

1. A resinous composition comprised essentially of (1) 100 parts by weight of a polymer selected from the group consisting of polyethylene, polypropylene and polyisobutylene, (2) from 0.1 to 5.0 parts by weight of a sterically hindered phenol selected from the group consisting of phenols, alkylene-bis phenols and thio-bis phenols containing at least two ring-substituted hydrocarbon groups containing from 1–10 carbon atoms, (3) from 0.2 to 5.0 parts by weight of a trialkyl phosphite wherein the alkyl groups each contain from 1 to 20 carbon atoms, (4) from 0.02 to 5.0 parts by weight of a metallic salt of a fatty acid containing from 4 to 18 carbon atoms wherein the metallic radical is selected from the group consisting of zinc, cadmium, mercuric and mercurous radicals, and (5) from zero to 5.0 parts by weight of a metallic salt of a fatty acid containing from 4 to 18 carbon atoms wherein the metallic radical is selected from the group consisting of sodium, aluminum, calcium, magnesium and strontium radicals and mixtures thereof; the total concentration of the herein specified non-resinous components not exceeding 10 parts by weight; said non-resinous components synergistically combining to stabilize said polymer against degradation due to heat and light.

2. A resinous composition comprised essentially of (1) 100 parts by weight of polyethylene, (2) from 3 to 5 parts by weight of 2,6-ditertiarybutyl-4-methyl-phenol, (3) from 1 to 3 parts by weight of tri-isooctyl phosphite, (4) from 1.5 to 3 parts by weight of zinc stearate, and (5) from zero to 3 parts by weight of a metallic stearate selected from the group consisting of sodium stearate, aluminum stearate, calcium stearate, magnesium stearate, strontium stearate and mixtures thereof; the total concentration of the herein specified non-resinous components not exceeding 10 parts by weight; said non-resinous components synergistically combining to stabilize said polymer against degradation due to heat and light.

3. A resinous composition as in claim 2 wherein the metallic stearate is calcium stearate.

4. A resinous composition as in claim 2 wherein the metallic stearate is sodium stearate.

5. A resinous composition comprised essentially of (1) 100 parts by weight of a polymer selected from the group consisting of polyethylene, polypropylene and polyisobutylene, (2) from 0.1 to 5.0 parts by weight of a sterically hindered phenol selected from the group consisting of phenols, alkylene-bis phenols and thio-bis phenols containing at least two ring-substituted hydrocarbon groups containing from 1-10 carbon atoms, (3) from 0.2 to 5.0 parts by weight of a trialkyl phosphite wherein the alkyl groups each contain from 1 to 20 carbon atoms, and (4) from 0.02 to 5.0 parts by weight of a metallic salt of a fatty acid containing from 4 to 18 carbon atoms wherein the metallic radical is selected from the group consisting of zinc, cadmium, mercuric and mercurous radicals; the total concentration of the herein specified non-resinous components not exceeding 10 parts by weight; said non-resinous components synergistically combining to stabilize said polymer against degradation due to heat and light.

6. A resinous composition comprised essentially of (1) 100 parts by weight of polyethylene, (2) from 3 to 5 parts by weight of 2,6-ditertiarybutyl-4-methyl-phenol, (3) from 1 to 3 parts by weight of tri-isooctyl phosphite, and (4) from 1.5 to 3 parts by weight of zinc stearate; the total concentration of the herein specified non-resinous components not exceeding 10 parts by weight; said non-resinous components synergistically combining to stabilize said polymer against degradation due to heat and light.

References Cited in the file of this patent

UNITED STATES PATENTS

| | | |
|---|---|---|
| 2,448,799 | Happoldt | Sept. 7, 1948 |
| 2,625,491 | Young | Jan. 13, 1953 |
| 2,710,821 | Fischer | June 14, 1955 |
| 2,727,879 | Vincent | Dec. 20, 1955 |
| 2,860,115 | Hecker et al. | Nov. 11, 1958 |